United States Patent
Judd et al.

(10) Patent No.: US 11,742,932 B2
(45) Date of Patent: Aug. 29, 2023

(54) SYSTEMS AND METHODS FOR CHANGING VHF DATA RADIO MODE DUE TO ELECTROMAGNETIC INTERFERENCE

(71) Applicant: Honeywell International Inc., Charlotte, NC (US)

(72) Inventors: Thomas D. Judd, Woodinville, WA (US); Divya Swarup Giriyappa Srinivasan, Bangalore (IN)

(73) Assignee: Honeywell International Inc., Charlotte, NC (US)

( * ) Notice: Subject to any disclaimer, the term of this patent is extended or adjusted under 35 U.S.C. 154(b) by 310 days.

(21) Appl. No.: 17/148,268

(22) Filed: Jan. 13, 2021

(65) Prior Publication Data

US 2022/0166494 A1   May 26, 2022

(30) Foreign Application Priority Data

Nov. 25, 2020   (IN) .............................. 202011051245

(51) Int. Cl.
*H04B 7/185* (2006.01)
*H04W 28/06* (2009.01)
*H04W 76/20* (2018.01)

(52) U.S. Cl.
CPC ........ *H04B 7/18506* (2013.01); *H04W 28/06* (2013.01); *H04W 76/20* (2018.02)

(58) Field of Classification Search
CPC .. H04B 7/18506; H04W 24/02; H04W 24/10; H04W 28/06; H04W 76/20; H04W 84/06; H04W 88/06

USPC ............ 455/515, 527; 370/329; 701/1, 120; 342/30, 33

See application file for complete search history.

(56) References Cited

U.S. PATENT DOCUMENTS

| 7,027,812 | B2 | 4/2006 | Dastrup et al. |
| 7,796,954 | B2 | 9/2010 | Whitaker Filho |
| 8,284,043 | B2 | 10/2012 | Judd et al. |
| 8,743,809 | B2 | 6/2014 | Vashi et al. |
| 9,998,360 | B2 | 6/2018 | McGuffin et al. |
| 10,243,646 | B2 * | 3/2019 | Zeng ....................... H04L 47/26 |
| 10,321,517 | B2 | 6/2019 | Shi |
| 10,362,531 | B2 | 7/2019 | Judd et al. |
| 10,425,149 | B1 | 9/2019 | Judd et al. |
| 10,756,808 | B1 * | 8/2020 | Shen ....................... G06V 40/70 |

(Continued)

FOREIGN PATENT DOCUMENTS

| CN | 111817771 A | 10/2020 |
| EP | 3236706 B1 | 6/2019 |

OTHER PUBLICATIONS

International Civil Aviation Organization, "Frequency Spectrum Management Panel (FSMP)", Seventh meeting of FSMP Working Group, Information Paper, Sep. 2018, pp. 1 through 8, ICAO.

(Continued)

*Primary Examiner* — Tan H Trinh
(74) *Attorney, Agent, or Firm* — Fogg & Powers LLC

(57) ABSTRACT

Techniques for detecting the presence of interference in a channel of a VHF data radio are provided. Upon detecting a sufficient level interference, the mode of the VHF data radio is changed from VHF data link (VDL) mode 2 to VDL mode A. Optionally, the VHF data radio mode may be changed back to VDL 2 from VDL mode A departing or preparing to depart.

20 Claims, 4 Drawing Sheets

(56) References Cited

U.S. PATENT DOCUMENTS

| | | | | |
|---|---|---|---|---|
| 2003/0093187 | A1* | 5/2003 | Walker | B64D 45/0059 |
| | | | | 701/1 |
| 2011/0099371 | A1* | 4/2011 | Roy | H04L 63/0823 |
| | | | | 713/168 |
| 2011/0255506 | A1 | 10/2011 | Toth et al. | |
| 2012/0038501 | A1* | 2/2012 | Schulte | G01S 13/782 |
| | | | | 342/30 |
| 2012/0113823 | A1 | 5/2012 | Zeng et al. | |
| 2012/0245836 | A1* | 9/2012 | White | G08G 5/06 |
| | | | | 701/120 |
| 2013/0094470 | A1* | 4/2013 | Zeng | H04B 7/18506 |
| | | | | 370/329 |
| 2014/0043184 | A1* | 2/2014 | Malaga | G01S 19/15 |
| | | | | 342/33 |
| 2015/0263781 | A1* | 9/2015 | Pelleschi | H04B 1/54 |
| | | | | 455/527 |
| 2016/0255572 | A1* | 9/2016 | Kaba | H04W 4/025 |
| | | | | 455/515 |
| 2020/0184834 | A1* | 6/2020 | Lohmiller | G08G 5/0052 |
| 2020/0295820 | A1* | 9/2020 | Yasunaga | H04W 84/06 |
| 2022/0086708 | A1* | 3/2022 | Hyslop | H04B 17/318 |

OTHER PUBLICATIONS

Sita, "Aircom Datalink VDL and ATN Services", Data Sheet, at least as early as Jan. 9, 2013, pp. 1 through 4, SITA.

European Patent Office, "Extended European Search Report from EP Application No. 21209396.7", from Foreign Counterpart to U.S. Appl. No. 17/14/,268, dated Apr. 7, 2022, pp. 1 through 6, Published: EP.

Zheng, et al., "Re-envisioning Air/Ground Communications for Aviation", 2019 IEEE/AIAA 38th Digital Avionics Systems Conference (DASC), Sep. 8, 2019, pp. 1 through 10, (c) 2019 IEEE.

* cited by examiner

SYSTEMS AND METHODS FOR CHANGING VHF DATA RADIO MODE DUE TO ELECTROMAGNETIC INTERFERENCE

CROSS-REFERENCE TO RELATED APPLICATIONS

The present application claims benefit of Indian Patent Application Serial No. 202011051245 filed Nov. 25, 2020; the entire contents of the aforementioned patent application is incorporated herein by reference as if set forth in its entirety.

BACKGROUND

For reasons of energy conservation and environmental concerns, light emitting diode (LED) lighting is replacing incandescent and fluorescent lighting. LED lighting does not use mercury found in fluorescent lighting and is more energy efficient than incandescent lighting. For these reasons, airport terminals now utilize LED lighting. While having such benefits, LED lighting generates electromagnetic interference, i.e., electromagnetic noise, in a very high frequency spectrum, e.g., from 30 to 300 MHz.

Aircraft utilize very high frequency (VHF) radios to send and receive data to others. Often, a VHF radio operates in VHF data link (VDL) mode 2 when the aircraft is at an airport terminal. When data is sent to an aircraft VHF data radio for transmission in a VHF channel to a recipient, the VHF data radio operating in VDL mode 2 performs collision sense multiple access (CSMA) analysis to determine whether a VHF channel is available, and thus that a VHF data radio can transmit in the VHF channel. CSMA analysis is performed in a media access control sub-layer of a link layer of the VHF data radio. CSMA analysis, when applied to a radio, is intended to avoid transmission in a channel (i.e., frequency spectrum) by the radio when such transmission would interfere with transmission(s), by one or more other radios, in the same channel. Thus, CSMA analysis is intended to determine channel availability by determining whether the one or more other radios are transmitting in the channel.

CSMA analysis of VDL mode 2 assesses VHF channel availability (for transmission) by determining total power in the VHF channel in which a VHF data radio would transmit. If the total power in a VHF channel is less than a power level threshold between −90 and −100 dBm[1], then, the CSMA analysis determines that the VHF channel is available, and as a result the VHF data radio transmits the data in the VHF channel. However, determination of total power, however, includes determination of both power from VHF radio emissions and electromagnetic noise in the VHF channel.

If the electromagnetic noise power from the LED lighting in the VHF channel exceeds all power level thresholds, then the ground station VHF data radio is unable to transmit data to the aircraft VHF data radio. Upon detecting no data from a ground station VHF data radio during a certain time period, the communication management unit (CMU) of the aircraft would automatically switch the aircraft VHF data radio to a different VDL mode, VDL mode A.

Electromagnetic noise power from LED lighting in the VHF channel, however, can be sufficiently high (with or without power in the VHF channel contributed from VHF radio emissions) that the total power of the VHF channel is never less than the power level threshold of an aircraft VHF data radio, but is less than the power level threshold of the ground station radio. As a result, a ground station radio can transmit uplink data in VDL mode 2 to an aircraft VHF data radio by an airport terminal, but the aircraft VHF data radio is unable transmit downlink data in VDL mode 2 to the ground station.

SUMMARY

A program product is provided. The program product comprises a non-transitory processor readable medium on which program instructions are embodied, wherein the program instructions are configured, when executed by at least one programmable processor, to cause the at least one programmable processor to: detect, external to a very high frequency (VHF) data radio, that (i) at least one of: an aircraft is on ground, an exterior aircraft door is open, aircraft brakes are on, the aircraft is stationary, and all aircraft engines are off, and (ii) at least one of: (a) during a first counter period, receives data indicating that the VHF data radio has received uplink data but does not receive any acknowledgement for data intended to be transmitted by the VHF data radio when the VHF data radio is configured to operate, in a VHF channel, in VHF digital link (VDL) mode 2, and (b) during a second counter period, receives data indicating that the VHF data radio has received uplink data and a VHF channel utilization exceeds an utilization threshold; and send a message to the VHF data radio to change a mode of the VHF data radio from VDL mode 2 to VDL mode A; wherein channel utilization is a representation of total power in the VHF channel of the VHF data radio.

DRAWINGS

Embodiments of the present invention can be more easily understood and further advantages and uses thereof more readily apparent, when considered in view of the description of the preferred embodiments and the following figures in which.

Figure 3:
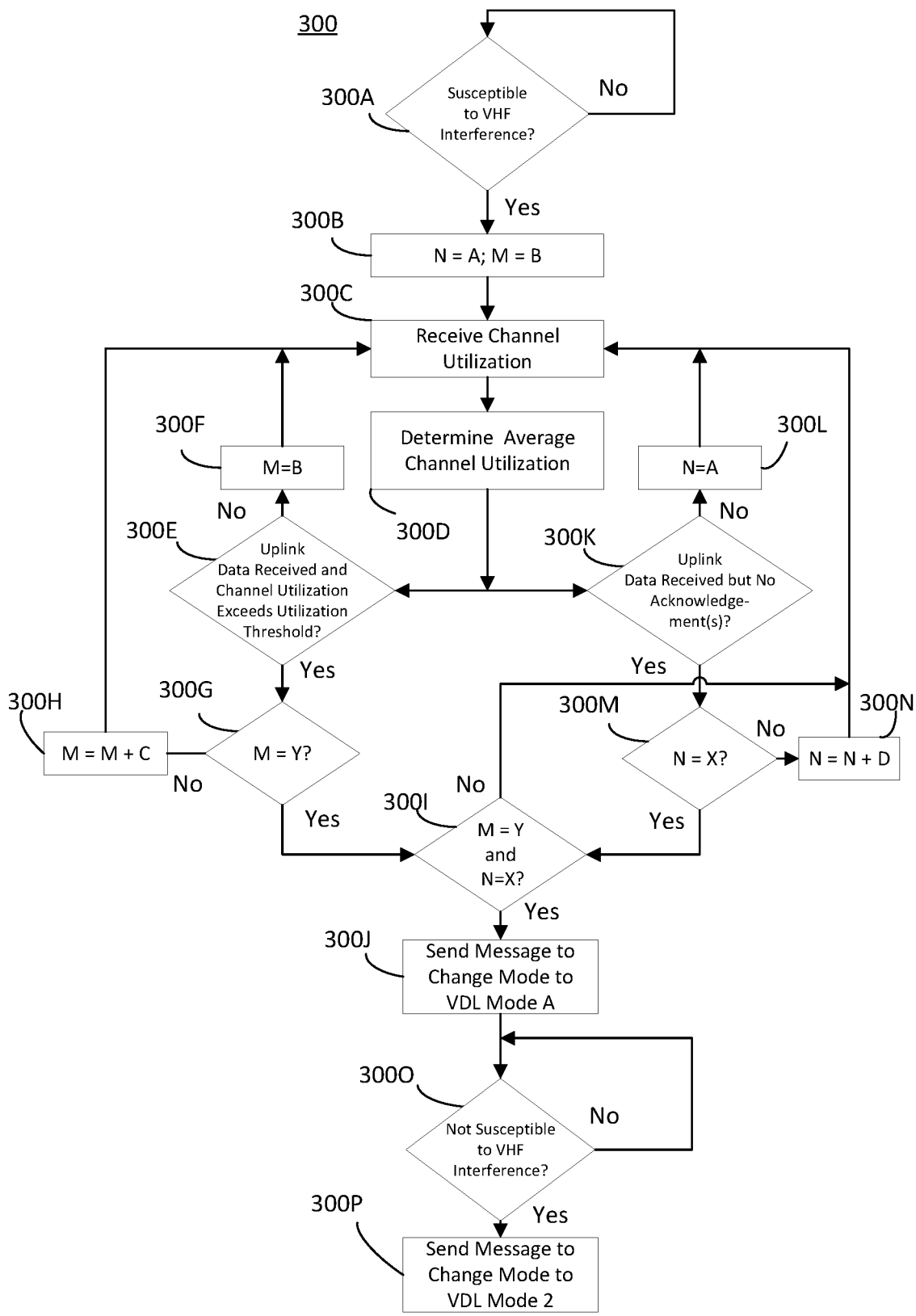
Figure 4:
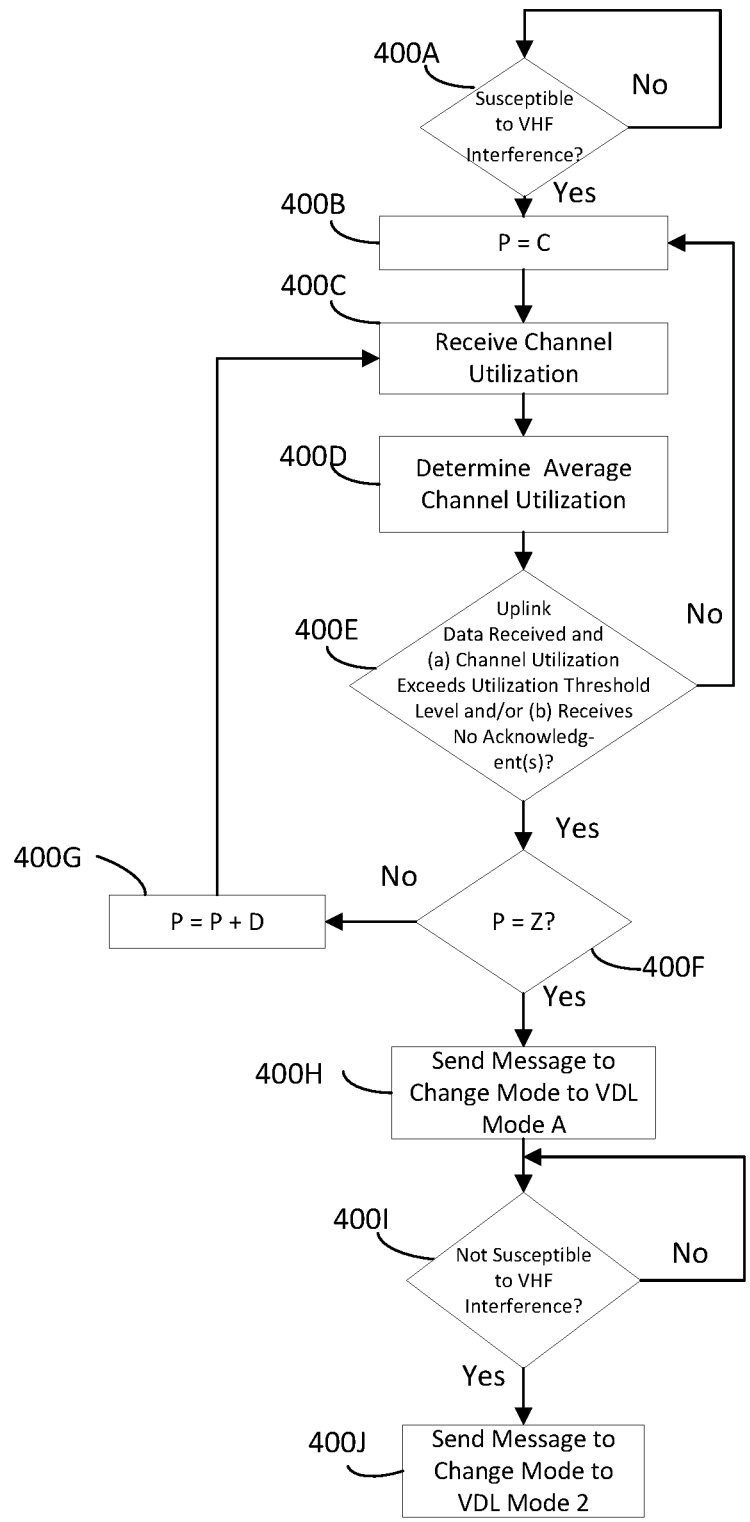

FIG. 3 illustrates a flow diagram of one embodiment of a method of changing VHF data radio mode to VDL mode A when VHF electromagnetic interference prevents a VHF data radio in VDL mode 2 from transmitting data; and FIG. 4 illustrates a flow diagram of another embodiment of a method 400 of changing VHF data radio mode to VDL mode A when VHF electromagnetic interference prevents a VHF data radio in VDL mode 2 from transmitting data.

In accordance with common practice, the various described features are not drawn to scale but are drawn to emphasize specific features relevant to the exemplary embodiments. Reference characters denote like elements throughout figures and text.

DETAILED DESCRIPTION

In the following detailed description, reference is made to the accompanying drawings that form a part hereof, and in which is shown by way of specific illustrative embodiments in which the invention may be practiced. These embodiments are described in sufficient detail to enable those skilled in the art to practice the invention, and it is to be understood that other embodiments may be utilized, and that logical, mechanical and electrical changes may be made without departing from the scope of the present invention. The following detailed description is, therefore, not to be taken in a limiting sense.

VHF data radios capable of transmitting and receiving data typically include at least two data modes: VDL mode A and VDL mode 2. Data as used herein means digital data which represent binary states or symbols which represent a more than one binary state. Data may be conveyed in the form of messages, e.g., in at least one of the following message protocols: aircraft communications addressing and reporting system (ACARS), Aeronautical Telecommunication Network (ATM)/Open Systems Interconnection (OSI), and ATN/Internet Protocol (IP). Optionally, the component, e.g., application, originating a message determines the message protocol used to convey the message.

VDL mode 2 uses a 25 kHz wide VHF channel, a differential 8-phase-shift keying modulation, and a symbol rate of 10,500 symbols per second. VDL mode 2 has an uncoded physical layer data rate of 31.5 kilobits/second. VDL mode A uses double side band (DSB)-amplitude modulation (AM) minimum shift keying (MSK) modulation and a data rate of 2.4 kilobits/second. VDL mode A utilizes a lower data rate and different modulation scheme in comparison to VDL mode 2. Because it offers a higher data rate, VDL mode 2 is typically utilized when available instead of VDL mode A.

VDL mode A uses a different type of CSMA analysis in comparison to VDL mode 2. VDL mode A detects whether a signal with specific modulation type (i.e., DSB-AM MSK modulation) is received by a VHF receiver in a VHF channel instead of assessing total power in the VHF channel as described above. As a result, CSMA analysis of VDL mode A does not account for noise power from LED lighting, and thus LED lighting noise does not prevent transmission of data by a radio operating in VDL mode A. Further, although it is sufficiently high to prevent transmission of data by a VHF data radio using VDL mode 2, LED lighting noise power in the VHF channel is not sufficiently high to prevent reception of data transmitted by another VHF data radio in the VHF channel. Thus, data, e.g., a message, may be sent from a component, e.g., a communications management unit, of an aircraft to a VHF radio for transmission, but may not be sent by the VHF data radio (e.g., via a ground station and a ground datalink network), to an intended recipient, e.g., operations and/or air traffic control (ATC) center(s); the component may alternatively be another aircraft system which sends a message to the VHF data radio through the CMU.

Embodiments of the invention provide systems and methods for determining a presence of VHF electromagnetic interference at an aircraft VHF data radio so that the aircraft VHF data radio cannot transmit downlink data due to power in a VHF channel exceeding a CSMA power level threshold of the aircraft VHF data radio due to VHF electromagnetic interference while the uplink data is received by the aircraft data radio from a ground station VHF data radio because the CSMA power level threshold of the ground station VHF data radio is higher than that of the aircraft VHF data radio. Upon determining the presence of VHF electromagnetic interference, a mode of the VHF data radio (used for data transmission and reception) is changed from VDL mode 2 to VDL mode A. Optionally, the embodiments of the invention may be implemented in a CMU or a component of the aircraft other than the VHF data radio to reduce implementation cost in comparison to making modification to the VHF data radio.

Figure 1:
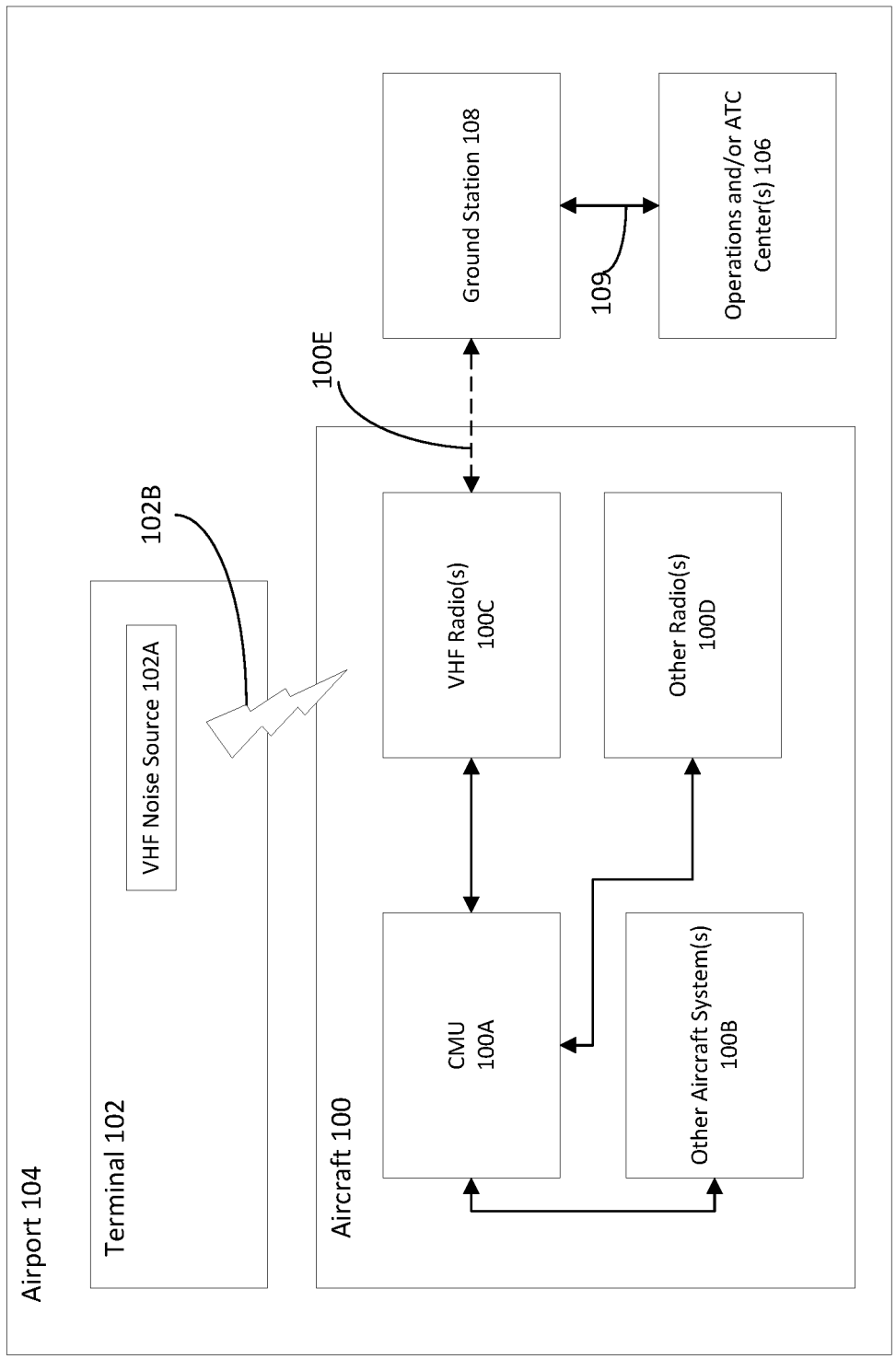
FIG. 1 illustrates one embodiment of a block diagram of an aircraft 100 near a terminal at an airport.

FIG. 1 illustrates one embodiment of a block diagram of an aircraft 100 near a terminal at an airport 104. This illustration is for pedagogical purposes, and the embodiments of the invention can be utilized when VHF noise occurs elsewhere when the aircraft 100 is on the ground and near a VHF noise source 102A even if the VHF noise source 102A is not in or by a terminal 102 of the airport 104.

In FIG. 1, the terminal 102 includes a VHF noise source 102A that emits electromagnetic interference (or electromagnetic noise) 102B in the VHF band. Optionally, the VHF noise source 102A comprises LED lighting; however, the VHF noise source 102A may be other sources of VHF noise. Near means that the aircraft is close to the VHF noise source 102A so that the electromagnetic noise 102B from the VHF noise source 102A in the terminal prevents transmission of data in a VHF channel from a VHF data radio (operating in VDL mode 2); the power of electromagnetic noise 102B in the VHF channel may be sufficient alone to prevent such transmission or may be sufficient only with the presences of power from one or more other VHF radios transmitting in the VHF channel.

Thus, the aircraft 100 may be moving or may be stationary near the VHF noise source 102A. When stationary, optionally, to embark or disembark passengers and/or cargo, the aircraft 100 may be connected to an airbridge extending from the terminal 102, stairs to ground, a passenger transfer vehicle, and/or a mobile luggage conveyor belt vehicle. Other techniques for embarking or disembarking passengers and/or cargo may be used such as stairs built into the aircraft.

The aircraft 100 comprises a modified communications management unit (CMU or modified communications management circuitry) 100A. The modified communications management unit 100A is configured to be communicatively coupled to at least one VHF radio (VHF radio(s)) 100C and to change the mode of a VHF data radio as further described herein. The VHF radio(s) 100C includes at least one VHF data radio configured to transmit and receive data. Data radio means a radio configured to transmit and receive data. Optionally, a VHF radio may be a VHF data radio (VDR) that can be configured for voice or data communications. Thus, optionally, all of the VHF radio(s) 100C may be VDR(s) that can be configured for voice or data communications. Optionally, only one of the VDR is placed in data mode at any given time; the other VDR(s) operate in voice mode. Voice mode is used for vocal communications.

Optionally, the CMU 100A is configured to be communicatively coupled to at least one other system (other aircraft system(s)) 100B and/or at least one other radio that are not VHF radios (other radio(s)) 100D. Optionally, one or more of the other radio(s) 100D may be data radio(s). Optionally, the other radio(s) 100D comprise at least one satellite communications (SATCOM) radio, at least one high frequency (HF) radio, at least one AeroMACS compliant radio, at least one IEEE802.11 compliant radio, and/or one or more of any other type of radio that is not a VHF radio. Optionally, VDRs may be desirable for data communications due to a lower cost of communications with VHF ground networks in comparison to other communications networks. The modified communications management unit 100A is configured to route data between (a) component(s) of the aircraft 100 (including component(s) of the CMU 100A and/or the other aircraft system(s) 100B) and (b) each of the VHF radio(s) 100C and each of the other radio(s) 100D that are data radio(s). Optionally, each of the other radio(s) 100D may be referred to as a datalink radio.

Each radio configured to transmit and/or receive data is configured to communicate data between the radio and the one or more operations and/or one or more ATC centers (operations and/or ATC center(s)) 106. Thus, the CMU 100A and each radio, configured to transmit and/or receive data, are configured to facilitate the transmission of data between the aircraft component(s) and/or the aircraft crew, and the operations and/or ATC center(s) 106. Crew of the aircraft may communicate with the operations and/or ATC center(s) 106 utilizing the component(s) of the CMU 100A and/or the other aircraft system(s) 100B.

The other aircraft system(s) 100B may comprise at least one of: a flight management system (or flight management circuitry), a maintenance system (or maintenance circuitry), at least one electronic flight bag (EFB(s) or EFB circuit(s)), a cabin terminal system (or cabin terminal circuitry), at least one input/output (I/O or input/output circuitry), and at least one sensor (or sensor circuitry). The other aircraft system(s) 100B are configured to provide data to and/or receive data from the CMU 100A. The flight management system, the maintenance system, the EFB(s), and/or the cabin terminal are configured to receive from and to transmit data to the CMU 100A. Optionally, the flight management system includes a messaging application used to transmit data to and receive data from, e.g., in a form of message(s) to be transmitted, e.g., the operations and/or ATC center(s) 106, through VHF and/or other radio(s) that are data radio(s); the CMU 100A routes data between such radio(s) and the aforementioned components.

The I/O is configured to convey data to the CMU 100A and/or emit or display data sent from the CMU 100A. When conveying data, such data may be placed in the form of a message by the I/O conveying it, by the CMU 100A upon receipt of such data, or by another component (or circuit) communicatively coupled between the conveying I/O component and the CMU 100A. Optionally, the emitted or displayed data may be extracted (by the receiving I/O component or another component (or circuit) communicatively coupled between the receiving I/O component and the CMU 100A) from a message sent to the I/O emitting or displaying the data.

Optionally, the at least one I/O comprises at least one: at least one keyboard, at least one display (e.g., touch screen display or multifunction display with buttons), at least one mouse, at least one touchscreen display, at least one touch control pad, at least one joy stick, at least one microphone, at least one speaker, and/or any other type of human machine interface component or circuitry. The at least one sensor may include one or more sensors (e.g., electromechanical, electrical, and/or electro-optical sensors) used to determine and then send corresponding data to the CMU 100A, e.g., whether an exterior aircraft door is open or closed, if aircraft wheel brakes are engaged or disengaged, if the engine is on or off (e.g. rotating or not rotating), if the aircraft is on the ground or not on the ground (e.g., airborne), if the aircraft is stationary or moving, and/or any other data about a state of the aircraft. For example, a global navigation satellite system receiver, e.g., a global positioning system receiver, may be used to determine if the aircraft is moving or stationary and if the aircraft is on the ground or is not on the ground.

Optionally, one or more types of data radio(s) described herein are configured to transmit data to and receive data from the operations and/or ATC center(s) 106 through a ground station 108 and ground datalink network 109 of a datalink service provider. The ground datalink network 109 may be a fiber optic communications network and/or any other type of communications network, and/or data router(s). Optionally, the datalink service provider may be Aeronautical Radio, Inc. (ARINC) and/or Société. Internationale de Telecommunications Aéronautiques S.c.r.l. (SITA).

Figure 2:
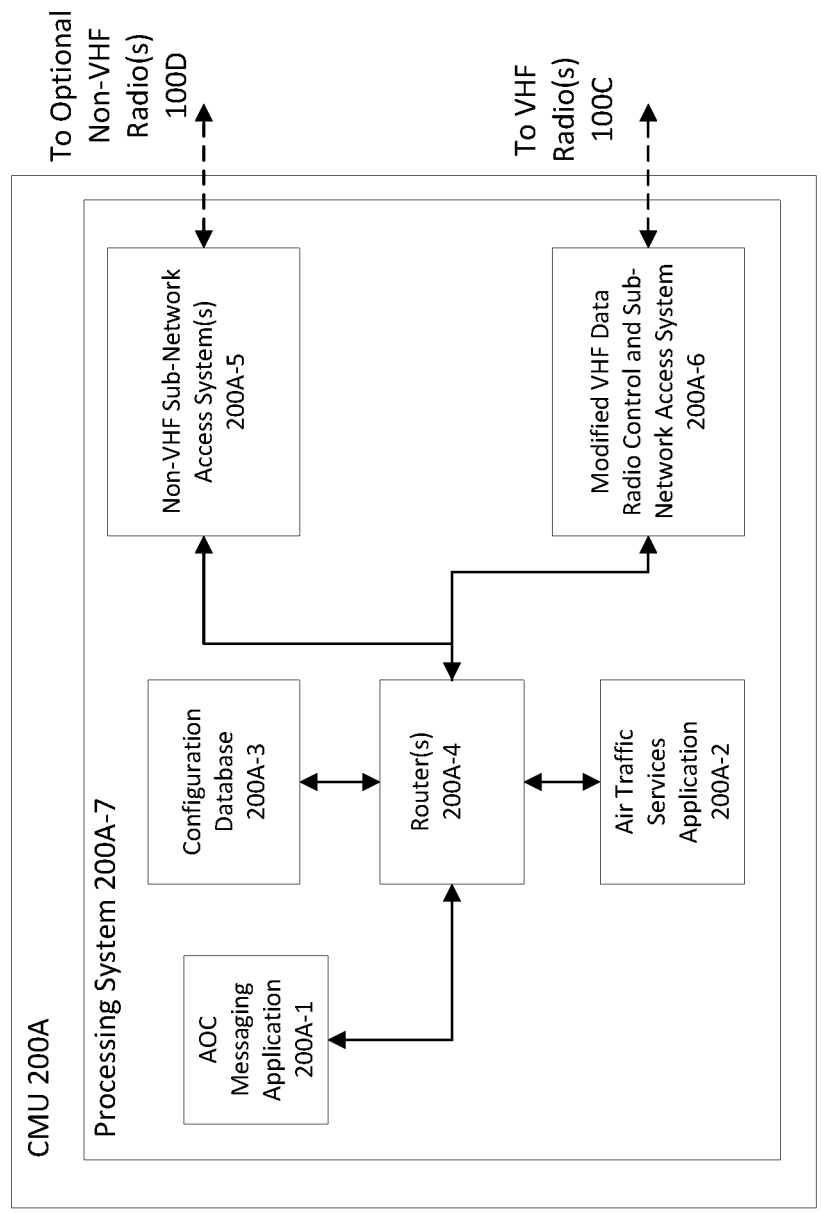
FIG. 2 illustrates one embodiment of a modified communications management unit.

FIG. 2 illustrates one embodiment of a modified communications management unit 200A. For purpose of clarity, the communications management unit 200A may be implement in other ways then described herein. Optionally, the CMU 200A comprises at least one router (router(s)) 200A-4, a configuration database 200A-3, a modified VHF sub-network access system (modified VHF sub-network access system(s)) 200A-7, an airlines operations center (AOC) messaging application 200A-1, and an air traffic services application 200A-2. Optionally, the CMU 200A further comprises at least one non-VHF sub-network access system (non-VHF sub-network access system(s)) 200A-5 (to the extent any non-VHF radio(s) are utilized by the CMU 200A). A unique non-VHF sub-network access system is used for each type of non-VHF radio configured to be actually and/or potentially installed in the aircraft.

The CMU 200A further comprises a processing system (or processing circuitry) 200A-7. The processing system 200A-7 may be a state machine, a neural network, and/or a quantum computing system or circuitry. Optionally, if a state machine, the processing system 200A-7 comprises processor circuitry communicatively coupled to memory circuitry. Optionally, the router(s) 200A-4, the AOC messaging application 200A-1, the air traffic services application 200A-2, the configuration database 200A-3, the modified VHF data radio control and sub-network access system 200A-6, and/or the optional non-VHF sub-network access system(s) 200A-5 are implemented in software stored in the memory circuitry and/or processed and/or executed by the processor circuitry.

The router(s) 200A-4 comprise at least one router configured to route message(s) of a unique message protocol (or data link protocol) received and/or transmitted by the CMU 200A. Optionally, the CMU 100A, and hence the router(s) 200A-4, are configured to route messages in in at least one of the following message protocols: aircraft communications addressing and reporting system (ACARS), Aeronautical Telecommunication Network (ATM)/Open Systems Interconnection (OSI), and ATN/Internet Protocol (IP).

The messages may originate with and/or be received by the AOC messaging application 200A-1, the air traffic services application 200A-2, and the other aircraft system(s) 100B. Optionally, such message sources select the protocol of the messages. Flight crew may enter data into the AOC messaging application 200A-1 and/or the air traffic services application 200A-2 to generate the messages from those components to be sent to the operations and/or ATC center(s) 106 (optionally respectively an AOC and/or an air traffic control operations center). Also, the AOC messaging application 200A-1 and/or the air traffic services application 200A-2 may automatically generate the messages based upon an occurrence of an event, e.g., an Out, Off, On and In (OOOI) In message, to be sent to the operations and/or ATC center(s) 106 (optionally respectively an AOC and/or an air traffic control operations center(s)). Messages received by the AOC messaging application 200A-1 and/or the air traffic services application 200A-2 may originate with the operations and/or ATC center(s) 106 (optionally respectively an AOC and/or an air traffic control operations center(s)).

Other aircraft system(s) 100B which may send messages to or receive messages from the operations and/or ATC center(s) 106 (optionally an AOC and/or an air traffic control operations center(s)) include the flight management system, the maintenance system, the cabin terminal system, and/or the EFB(s). Optionally, the flight management system and/or the CMU 200A may send messages about the aircraft's geographic position and/or flight plan to the operations and/or ATC center(s) 106 (optionally an AOC and/or an air traffic control operations center(s)). The maintenance system may generate send messages about the status of aircraft system(s) or components. The cabin terminal system and/or EFB(s) may be used to send messages from aircraft crew and receive messages for aircraft crew. The configuration database 200A-3 stores data used to configure the router(s) 200A-4 and to configure the AOC messaging application 200A-1.

Each optional non-VHF sub-network access system is configured to be communicatively coupled to the non-VHF radio(s) of a specific type, e.g., HF or SATCOM radios. Each optional non-VHF sub-network access system is configured to serve as an interface between a specific type of another radio (i.e., non-VHF radio) that is a data radio and the router(s) 200A-4. Each optional non-VHF sub-network access system conveys data, e.g., messages, between corresponding radio(s) of a type of the other non-VHF radio(s) to which the non-VHF sub-network access system is communicatively coupled and a router corresponding to a protocol of the message send or received by the non-VHF sub-network access system. Optionally, each non-VHF sub-network access system is configured to monitor data from each of the non-VHF radio(s) 100C pertaining to health of such radio(s), e.g., whether a non-VHF radio is on or off and whether or not there is an impedance mismatch between a non-VHF radio and its antenna(s). Thus, optionally, each non-VHF sub-network access system 200A-6 is configured to notify other aircraft system(s) 100B (e.g., the maintenance system and/or aircraft crew) in the event the non-VHF sub-network access system determines based upon the monitored data from VHF radio(s) of a corresponding type has or is about to cease to function properly, e.g., to meet one or more performance specifications.

The VHF sub-network access system 200A-6 is configured to be communicatively coupled to the VHF radio(s) 100C. The VHF sub-network access system 200A-6 is configured to serve as an interface between a VHF radio that is a data radio and the router(s) 200A-4. The VHF sub-network access system 200A-6 conveys data, e.g., messages, between a corresponding VHF radio that is a data radio to which the VHF sub-network access system 200A-6 is communicatively coupled and a router corresponding to a protocol of the message send or received by the VHF sub-network access system 200A-6. Optionally, the modified VHF sub-network access system 200A-6 is configured to be communicatively coupled to the VHF radio(s) 100C to monitor data from each of the VHF radio(s) 100C pertaining to the health of such radio(s), e.g., whether a VHF radio is on or off and whether or not there is an impedance mismatch between a VHF radio and its antenna(s). The modified VHF sub-network access system 200A-6 is configured to notify other aircraft system(s) 100B (e.g., the maintenance system and/or aircraft crew) in the event the modified VHF sub-network access system 200A-6 determines based upon the monitored data that a VHF radio has or is about to cease to function properly, e.g., to meet one or more performance specifications. Optionally, the modified VHF sub-network access system 200A-6 is also configured to set the channel and mode, e.g., VDL mode A or VDL mode 2, of each VHF radio that is a data radio; the channel may be selected, e.g., based upon aircraft location and/or instruction messages from a datalink service provider, by the aircraft crew, by the other aircraft system(s) 100B, and/or by the CMU 200A.

The AOC messaging application 200A-1 is configured to generate messages (to be sent to an AOC center or an ATC center through the CMU 100A and a data radio) by aircraft crew and to receive messages (to be received though the CMU 100A and a radio) from the AOC center or the ATC center by the aircraft crew. Optionally, the air traffic services application 200A-2 may comply with ARINC characteristic 623 standard. The air traffic services application 200A-2 is configured to generate messages (to be sent to an air traffic control operations center though the CMU 100A and a radio) by aircraft crew and to receive messages (to be received though the CMU 100A and a radio) from the air traffic control operations center by the aircraft crew.

Techniques will now be further described for determining a presence of VHF electromagnetic interference, and upon determining the presence of VHF electromagnetic interference then changing a mode of the VHF data radio (used for data transmission and reception) from VDL mode 2 to VDL mode A. As illustrated herein, such techniques can be implemented in the modified VHF data radio control and sub-network access system 200A-6. However, alternatively such techniques can be implemented in other components of the CMU 200A or in other aircraft system(s) 100B.

Optionally, embodiments of the invention comprises detecting, external to a VHF data radio, that (i) at least one of: an aircraft is on ground, an exterior aircraft door is open, aircraft brakes are on, the aircraft is stationary, and all aircraft engines are off, and (ii) at least one of: (a) during a first counter period (e.g., five minutes or another time period), receipt of data indicating that the VHF data radio has received uplink data but does not receive any acknowledgement for data intended to be transmitted by the VHF data radio when the VHF data radio is configured to operate, in a VHF channel, in VHF digital link (VDL) mode 2, and (b) during a second counter period (e.g., two minutes or another time period), receipt of data indicating that the VHF data radio has received uplink data and a VHF channel utilization exceeds an utilization threshold. Counter period means a time period or a period of counts.

Acknowledgement means data, e.g., a message, from an intended recipient (or a ground data link service provider, e.g., a ground station 108 or a ground datalink network 109) that a message send by the VHF data radio was received. An acknowledgement of a downlink message may be from a ground station 108, ground datalink network 109, or an intended recipient, e.g., one of the operations and/or ATC center(s) 106. For example, when ACARS message protocol is used, the acknowledgement is generated by an ACARS protocol stack router of the ground datalink network 109 of the datalink service provider relaying the data. Optionally, data may be sent in a form of a message, and a corresponding acknowledgement may be received, through a VHF data radio with at least one of the following communication protocols: ARINC 631 specification compliant VDL mode 2, Aeronautical Radio, Inc. (ARINC) 618 specification compliant aircraft communications addressing and reporting system (ACARS), Aeronautical Telecommunication Network (ATN)/open systems interconnection (OSI), and ATN/Internet Protocol (IP). The acknowledgement received by the aircraft 100 or its components indicates that the data in the downlink, e.g., the message sent from the aircraft 100, has been received.

Optionally, the first and second counter periods may be the same. The first and second counter periods may be defined by a designer and/or user of a system incorporating an embodiment of the invention.

As discussed elsewhere herein, data, e.g., a downlink message, may be sent from a component of an aircraft, e.g., by or through the CMU 200A, to a VHF data radio for transmission, but may not be sent by the VHF data radio to an intended recipient, e.g., one of the operations and/or center(s) 106. FIG. 3 illustrates a flow diagram of one embodiment of a method 300 of changing VHF data radio mode to VDL mode A when VHF electromagnetic interference prevents a VHF data radio in VDL mode 2 from transmitting data, e.g., received from the CMU 200A. After having its mode changed to VDL mode A, the VHF data radio can transmit received data to intended recipient(s). Optionally, the method may be implemented in the non-VHF sub-network access system(s); however, alternatively, the method may be implemented in another component of the CMU 200A or even in another component of the aircraft 100. Optionally, at least one of the memory circuitry and processing circuitry (comprising the CMU 200A) are configured to generate the data or to receive data from at least one other aircraft system communicatively coupled to at least one of the memory circuitry and processor circuitry.

To the extent that the methods shown in any of the Figures is described herein as being implemented in the system shown in FIGS. 1 and 2, it is to be understood that other embodiments can be implemented in other ways. The blocks of the flow diagrams have been arranged in a generally sequential manner for ease of explanation; however, it is to be understood that this arrangement is merely exemplary, and it should be recognized that the processing associated with the methods (and the blocks shown in the Figures) can occur in a different order (for example, where at least some of the processing associated with the blocks is performed in parallel and/or in an event-driven manner). The method 300 is performed external to a VHF data radio.

In block 300A, it is determined whether a VHF data radio is susceptible to VHF electromagnetic interference. A VHF data radio may be susceptible to VHF electromagnetic interference if the aircraft is on the ground, and thus may be in proximity of VHF noise source(s) such as LED lighting. Optionally, this can be determined by detecting at least one of: an aircraft is on ground, an exterior aircraft door is open, aircraft brakes are on, the aircraft is stationary, and all aircraft engines are off. Such detection may be made by sensors in the aircraft. Optionally, in one embodiment, the foregoing may be detected upon the CMU sending an OOOI In message to operations and/or aircraft traffic control center(s).

If it is determined the VHF data radio is susceptible to VHF electromagnetic interference, then proceed to block 300B. If it is determined the VHF data radio is not susceptible to VHF electromagnetic interference, then return to block 300A.

In block 300B, variables N and M are each set to respectively A and B. A and B may be the same or a different number, e.g., integers or non-integers. Optionally, each of A and B can be zero, one, or another number.

In block 300C, channel utilization data is received from a VHF data radio configured to operate in VDL mode 2. Optionally, the VHF data radio comprises one of the VHF radio(s) 100C. Channel utilization means a representation of total power in the VHF channel (e.g., the transmit channel) of the VHF data radio; the total power may be from electromagnetic noise and/or transmission from other radios in the VHF channel. Optionally, the channel utilization is determined by the VHF data radio. The number indicating channel utilization may be the total power in the VHF channel or a number that is a function of the total power in the VHF channel (e.g., adjusted by a scaling factor or some other function of the total power). Optionally, the channel utilization is periodically provided periodically or a periodically, e.g., with a period that may range from 0.25 seconds to three seconds, such as for example every second.

Optionally, in block 300D, an average channel utilization is determined by averaging the channel utilization received in block 300C with the last determined average channel utilization determined previously in optional block 300D. If there was no last determined average channel utilization, then the average channel utilization is the channel utilization received in block 300C. However, the average channel utilization may be calculated a different way, e.g., by averaging the currently received channel utilization with the previous Z received channel utilizations, where Z is an integer greater than zero.

After block 300D, proceed to blocks 300E and 300K and to independent analysis paths. Blocks 300K, 300L, 300M and 300N form a first analysis path. Blocks 300E, 300F, 300G, and 300H form a second analysis path. FIG. 3 illustrates both the first and second analysis paths for pedagogical purposes. Optionally, embodiments of the invention may include the first analysis path only, the second analysis path only, or both the first and second analysis paths as illustrated in FIG. 3.

With respect to the first analysis path, in block 300K, if uplink data is determined to be received but one or more acknowledgements (acknowledgement(s)) are not received, then proceed to block 300M. Note, if uplink data is received but no acknowledgement(s) are received, e.g., during a first counter period, other aircraft component(s), e.g., the CMU 100A, would change the mode of the VHF data radio from Mode 2 to Mode A; optionally the first counter period may be equal to the second counter period. If uplink data is determined to be received and the acknowledgements are received, then proceed to block 300L. Uplink data means data, e.g., messages, received by the VHF data radio and optionally also by another aircraft component, e.g., the CMU 100A or one of the other aircraft system(s) 100B; optionally, such data may originate from one or more of the operations and/or ATC center(s) 106. Uplink data received by the VHF data radio may be intended for the aircraft 100 and/or other aircraft.

Uplink data may determined to be received by receiving data from the VHF data radio indicating that the VHF data radio has received uplink data. Data indicating that the VHF data radio has received uplink data comprises at least one of an uplink message received by the VHF data radio and a signal quality parameter (SQP) message from the VHF data radio. The SQP message indicates that the VHF data radio has received a message intended for the aircraft or for another aircraft.

In block 300L, variable N is set to A which is described elsewhere herein. After performing block 300L, block 300C is again performed.

In block 300M, it is determined whether variable N is equal to the first counter period (represented by variable X). If variable N equals the first counter period, then proceed to optional block 300I or block 300J. If variable N does not equal the first counter period, then proceed to block 300N. Optionally, in block 300M, it can be determined whether variable N is equal to or is greater than the first counter period; in such a case the outcome would be unchanged from what is described above for when assessing whether variable N is equal to the first counter period.

In block 300N, variable N is set to equal variable N plus D, where D is a number, e.g., an integer such as for example one. Thus, increment variable N by D. Then, return to block 300C.

Optionally, the VDR mode is only changed if conditions of blocks 300G and 300M are both determined to be true (or satisfied). Thus, in optional block 300I, it is determined whether the variable M is equal to the second counter period and whether the variable N is equal to the first counter period. If both the variable M is equal to the second counter period and the variable N is equal to the first counter period, then proceed to block 300J. If variable M is not equal to the second counter period and/or variable N is not equal to the first counter period, then proceed to block 300C. Optionally, in block 300I, it can be determined whether the variable M is equal to or greater than the second counter period and the variable N is equal to or is greater than the first counter period; in such a case the outcome would be unchanged from what is described above for when assessing whether the variable M is equal to the second counter period and whether the variable N is equal to the first counter period.

In block 300J, a message is sent to the VHF data radio to change the mode of the VHF data radio from VDL mode 2 to VDL mode A. Optionally, in block 300J, data, e.g., message(s), is resent (to the VHF data radio); such data was previously provided for transmission to the VHF data radio, e.g., by the CMU 100A, but may not have been transmitted and/or was not transmitted.

After block 300J, in optional block 300O, it is determined whether the VHF data radio is no longer susceptible to VHF electromagnetic interference. A VHF data radio may be no longer be susceptible to VHF electromagnetic interference if the aircraft is no longer on the ground or moving (e.g., away from sources of VHF electromagnetic interference), and thus may be in proximity of VHF noise source(s) such as LED lighting. Optionally, this can be determined by detecting at least one of: an aircraft is not on the ground, all exterior aircraft doors are closed, aircraft brakes are off, the aircraft is moving, and all aircraft engines are on. Such detection may be made by sensors in the aircraft. Optionally, in one embodiment, the foregoing may be detected upon the CMU sending an OOOI Out message to operations and/or aircraft traffic control center(s).

If it is determined that the aircraft is that the VHF data radio is no longer susceptible to VHF electromagnetic interference, then in optional block 300P send a message to the VHF data radio to change the mode of the VHF data radio to VDL mode 2 (from VDL mode A). If it is determined that the aircraft is still susceptible to VHF electromagnetic interference, then return to optional block 300O.

With respect to the second analysis path, in block 300E, if uplink data is determined to be received and if the channel utilization (or optionally the average channel utilization if block 300D is performed) exceeds a utilization threshold level, then proceed to block 300G. The utilization threshold level may be defined by a designer and/or user of a system incorporating an embodiment of the invention.

If no uplink data is received, e.g., during a third counter period, an aircraft component, e.g., the CMU 100A, would send a message to the VHF data radio to change the mode of the VHF data radio from Mode 2 to Mode A. Optionally, the third counter period may equal the first counter period and/or the second counter period. If uplink data is determined not to be received and/or if the channel utilization (or optionally the average channel utilization if block 300E is performed) does not exceeds the utilization threshold, then proceed to block 300F.

In block 300F, variable M is set to B which is described elsewhere herein. After performing block 300F, block 300C is again performed.

In block 300G, it is determined whether variable M is equal to a second counter period (represented by variable Y). If variable M equals the second counter period, then proceed to optional block 300I or block 300J. If variable M does not equal the second counter period, then proceed to block 300H. Optionally, in block 300G, it can be determined whether variable M is equal to or is greater than the second counter period; in such a case the preceding outcomes would be unchanged from what is described above for when assessing whether variable M equals the second counter period.

In block 300H, variable N is set to equal variable N plus C, where C is a number, e.g., an integer such as for example one. Thus, increment variable N by C. Then, return to block 300C.

FIG. 4 illustrates a flow diagram of another embodiment of a method 400 of changing VHF data radio mode to VDL mode A when VHF electromagnetic interference prevents a VHF data radio in VDL mode 2 from transmitting data. Optionally, the method may be implemented in the non-VHF sub-network access system(s); however, alternatively, the method may be implemented in another component of the CMU 200A or even in another component of the aircraft 100. The method 400 is performed external to a VHF data radio.

In block 400A, it is determined whether a VHF data radio is susceptible to VHF electromagnetic interference. A VHF data radio may be susceptible to VHF electromagnetic interference if the aircraft is on the ground, and thus may be in proximity of VHF noise source(s) such as LED lighting. Optionally, this can be determined by detecting at least one of: an aircraft is on ground, an exterior aircraft door is open, aircraft brakes are on, the aircraft is stationary, and all aircraft engines are off. Such detection may be made by sensors in the aircraft. Optionally, in one embodiment, the foregoing may be detected upon the CMU sending an OOOI In message to operations and/or aircraft traffic control center(s).

If it is determined the VHF data radio is susceptible to VHF electromagnetic interference, then proceed to block 400B. If it is determined the VHF data radio is not susceptible to VHF electromagnetic interference, then return to block 400A.

In block 400B, variable P is set to equal to C. C may be an integer or non-integers. Optionally, C can be zero, one, or another number.

In block 400C, channel utilization data is received from a VHF data radio configured to operate in VDL mode 2. Optionally, the channel utilization is periodically provided periodically or a periodically, e.g., with a period that may range from 0.25 seconds to three seconds, such as for example every second.

For the embodiment illustrated in FIG. 4, the first counter period and the second counter period described with respect to FIG. 3 are equal and are thus represented by a fourth time period represented by variable Z. Optionally, the VHF data radio comprises one of the VHF radio(s) 100C.

Optionally, in block 400D an average channel utilization is determined by averaging the channel utilization received in block 400C with the last determined average channel utilization determined previously in optional block 400D. If there was no last determined average channel utilization, then the average channel utilization is the channel utilization received in block 400B. However, the average channel utilization may be calculated a different way, e.g., by averaging the currently received channel utilization with the previous Z received channel utilizations, where Z is an integer greater than zero.

In block 400E, determine whether uplink data has been received, and (a) whether channel utilization (or optionally the average channel utilization if block 400C is performed) exceeds the utilization threshold level and/or (b) whether no acknowledgement(s) were received. For purposes of clarity, (a) and (b) or only one of (a) and (b) need be evaluated.

If uplink data has been received, and at least one of (i) channel utilization exceeds the utilization threshold level and/or (ii) no acknowledgement(s) were received, then proceed to block 400F. If uplink data has been received and at least one of: (x) channel utilization does not exceed the utilization threshold level and (y) acknowledgement(s) were received, then return to block 400B. If no uplink data is received, e.g., during the third counter period or another time period, then an aircraft component, e.g., the CMU 100A, would send a message to the VHF data radio to change the mode of the VHF data radio from Mode 2 to Mode A.

In block 400F, determine if variable P is equal to the fourth counter period represented by variable Z. Optionally, the fourth counter period may equal at least one of the first counter period and the second counter period. Optionally, in block 400F, determine if variable P is greater than or equal to the fourth counter period; in such a case the preceding outcomes would be unchanged from what is described above for when assessing whether variable P equals the fourth counter period.

If the fourth counter period equals variable P, then proceed to block 400H. If the fourth counter period does not equal variable P, then proceed to block 400G.

In block 400G, a message is sent to the VHF data radio to change the mode of the VHF data radio from VDL mode 2 to VDL mode A. Optionally, in block 400G, data, e.g., message(s), is resent to the VHF data radio; such data was previously provided for transmission to the VHF data radio, e.g., by the CMU 100A, but may not have been transmitted and/or was not transmitted.

After block 400H, in optional block 400I, it is determined whether the VHF data radio is no longer susceptible to VHF electromagnetic interference. A VHF data radio may be no longer be susceptible to VHF electromagnetic interference if the aircraft is no longer on the ground or moving (e.g., away from sources of VHF electromagnetic interference), and thus may be in proximity of VHF noise source(s) such as LED lighting. Optionally, this can be determined by detecting at least one of: an aircraft is not on the ground, all exterior aircraft doors are closed, aircraft brakes are off, the aircraft is moving, and all aircraft engines are on. Such detection may be made by sensors in the aircraft. Optionally, in one embodiment, the foregoing may be detected upon the CMU sending an OOOI Out message to operations and/or aircraft traffic control center(s).

If it is determined that the aircraft is that the VHF data radio is no longer susceptible to VHF electromagnetic interference, then in optional block 400J send a message to the VHF data radio to change the mode of the VHF data radio to VDL mode 2 (from VDL mode A). If it is determined that the aircraft is still susceptible to VHF electromagnetic interference, then return to optional block 400I.

The processor circuitry described herein may include one or more microprocessors, microcontrollers, digital signal processing (DSP) elements, application-specific integrated circuits (ASICs), and/or field programmable gate arrays (FPGAs). In this exemplary embodiment, processor circuitry includes or functions with software programs, firmware, or other computer readable instructions for carrying out various process tasks, calculations, and control functions, used in the methods described herein. These instructions are typically tangibly embodied on any storage media (or computer readable medium) used for storage of computer readable instructions or data structures.

The memory circuitry described herein can be implemented with any available storage media (or computer readable medium) that can be accessed by a general purpose or special purpose computer or processor, or any programmable logic device. Suitable computer readable medium may include storage or memory media such as semiconductor, magnetic, and/or optical media. For example, computer readable media may include conventional hard disks, Compact Disk-Read Only Memory (CD-ROM), DVDs, volatile or non-volatile media such as Random Access Memory (RAM) (including, but not limited to, Dynamic Random Access Memory (DRAM)), Read Only Memory (ROM), Electrically Erasable Programmable ROM (EEPROM), and/or flash memory. Combinations of the above are also included within the scope of computer readable media.

Methods of the invention can be implemented in computer readable instructions, such as program modules or applications, which may be stored in the computer readable medium that is part of (optionally the memory circuitry) or communicatively coupled to the processing circuitry, and executed by the processing circuitry, optionally the processor circuitry. Generally, program modules or applications include routines, programs, objects, data components, data structures, algorithms, and the like, which perform particular tasks or implement particular abstract data types.

Databases as used herein may be either conventional databases or data storage formats of any type, e.g., data files. Although separate databases are recited herein, one or more of such databases may be combined.

In various alternative embodiments, system elements, method steps, or examples described throughout this disclosure may be implemented on one or more computer systems, field programmable gate array (FPGA), or similar devices comprising a processor executing code to realize those elements, processes, or examples, said code stored on a non-transient data storage device. Therefore, other embodiments of the present disclosure may include elements comprising program instructions resident on computer readable media which when implemented by such computer systems, enable them to implement the embodiments described herein. As used herein, the term "computer readable media" refers to tangible memory storage devices having non-transient physical forms. Such non-transient physical forms may include computer memory devices, such as but not limited to punch cards, magnetic disk or tape, any optical data storage system, flash read only memory (ROM), non-volatile ROM, programmable ROM (PROM), erasable-programmable ROM (E-PROM), random access memory (RAM), or any other form of permanent, semi-permanent, or temporary memory storage system or device having a physical, tangible form. Program instructions include, but are not limited to computer-executable instructions executed by computer system processors and hardware description languages such as Very High Speed Integrated Circuit (VHSIC) Hardware Description Language (VHDL).

EXEMPLARY EMBODIMENTS

Example 1 includes a method, comprising: detecting, external to a very high frequency (VHF) data radio, that (i)

at least one of: an aircraft is on ground, an exterior aircraft door is open, aircraft brakes are on, the aircraft is stationary, and all aircraft engines are off, and (ii) at least one of: (a) during a first counter period, receives data indicating that the VHF data radio has received uplink data but does not receive any acknowledgement for data intended to be transmitted by the VHF data radio when the VHF data radio is configured to operate, in a VHF channel, in VHF digital link (VDL) mode 2, and (b) during a second counter period, receives data indicating that the VHF data radio has received uplink data and a VHF channel utilization exceeds an utilization threshold; and sending a message to the VHF data radio to change a mode of the VHF data radio from VDL mode 2 to VDL mode A; wherein channel utilization is a representation of total power in the VHF channel of the VHF data radio.

Example 2 includes the method of example 1, wherein the first counter period and the second counter period are equal.

Example 3 includes the method of any of examples 1-2, wherein sending the message to the VHF data radio to change the mode further comprises resending, to the VHF data radio, messages previously provided for transmission to the VHF data radio, but which were not transmitted by the VHF data radio in VDL mode Example 2.

Example 4 includes the method of any of examples 1-3, further comprising determining an average of the VHF channel utilization; wherein determining if the VHF channel utilization exceeds the utilization threshold comprises determining if the average VHF channel utilization exceeds the utilization threshold.

Example 5 includes the method of any of examples 1-4, further comprising receiving the channel utilization from the VHF data radio.

Example 6 includes the method of any of examples 1-5, wherein the data indicating that the VHF data radio has received uplink data comprises at least one of an uplink message received by the VHF data radio and a signal quality parameter message from the VHF data radio.

Example 7 includes a program product comprising a non-transitory processor readable medium on which program instructions are embodied, wherein the program instructions are configured, when executed by at least one programmable processor, to cause the at least one programmable processor to: detect, external to a very high frequency (VHF) data radio, that (i) at least one of: an aircraft is on ground, an exterior aircraft door is open, aircraft brakes are on, the aircraft is stationary, and all aircraft engines are off, and (ii) at least one of: (a) during a first counter period, receives data indicating that the VHF data radio has received uplink data but does not receive any acknowledgement for data intended to be transmitted by the VHF data radio when the VHF data radio is configured to operate, in a VHF channel, in VHF digital link (VDL) mode 2, and (b) during a second counter period, receives data indicating that the VHF data radio has received uplink data and a VHF channel utilization exceeds an utilization threshold; and send a message to the VHF data radio to change a mode of the VHF data radio from VDL mode 2 to VDL mode A; wherein channel utilization is a representation of total power in the VHF channel of the VHF data radio.

Example 8 includes the program product of Example 7, wherein the first counter period and the second counter period are equal.

Example 9 includes the program product of any of examples 7-8, wherein sending the message to the VHF data radio to change the mode further comprises resending, to the VHF data radio, messages previously provided for transmission to the VHF data radio, but which were not transmitted by the VHF data radio in VDL mode Example 2.

Example 10 includes the program product of any of examples 7-9, wherein the program instructions are configured, when executed by the at least one programmable processor, to further cause the at least one programmable processor to: determine an average of the VHF channel utilization; wherein determining if the VHF channel utilization exceeds the utilization threshold comprises determine if the average VHF channel utilization exceeds the utilization threshold.

Example 11 includes the program product of any of examples 7-10, wherein the program instructions are configured, when executed by the at least one programmable processor, to further cause the at least one programmable processor to: receive the channel utilization from the VHF data radio.

Example 12 includes the program product of any of examples 7-11, wherein the data indicating that the VHF data radio has received uplink data comprises at least one of an uplink message received by the VHF data radio and a signal quality parameter message from the VHF data radio.

Example 13 includes the program product of any of examples 7-12, wherein the program instructions are configured, when executed by the at least one programmable processor, to further cause the at least one programmable processor to: detect that at least one of: an aircraft is not on the ground, all exterior aircraft doors are closed, aircraft brakes are off, the aircraft is moving, and all aircraft engines are off; and send a message to the VHF data radio to change a mode of the VHF data radio from VDL mode A to VDL mode 2;

Example 14 includes a communications management system (CMU) communicatively coupled to a very high frequency (VHF) data radio, the CMU comprising: memory circuitry; and processor circuitry communicatively coupled to the memory circuitry and configured to: detect that (i) at least one of: an aircraft is on ground, an exterior aircraft door is open, aircraft brakes are on, the aircraft is stationary, and all aircraft engines are off, and (ii) at least one of: (a) during a first counter period, receives data indicating that the VHF data radio has received uplink data but does not receive any acknowledgement for data intended to be transmitted by the VHF data radio when the VHF data radio is configured to operate, in a VHF channel, in VHF digital link (VDL) mode 2, and (b) during a second counter period, receives data indicating that the VHF data radio has received uplink data and a VHF channel utilization exceeds an utilization threshold; and send a message to the VHF data radio to change a mode of the VHF data radio from VDL mode 2 to VDL mode A; wherein channel utilization is a representation of total power in the VHF channel of the VHF data radio.

Example 15 includes the communications management system of Example 14, wherein the first counter period and the second counter period are equal.

Example 16 includes the communications management system of any of examples 14-15, wherein sending the message to the VHF data radio to change the mode further comprises resending, to the VHF data radio, messages previously provided for transmission to the VHF data radio, but which were not transmitted by the VHF data radio in VDL mode Example 2.

Example 17 includes the communications management system of any of examples 14-16, wherein the processor circuitry is further configured to: determine an average of the VHF channel utilization; wherein determining if the VHF channel utilization exceeds the utilization threshold comprises determine if the average VHF channel utilization exceeds the utilization threshold.

Example 18 includes the communications management system of any of examples 14-17, wherein the processor circuitry is further configured to receive the channel utilization from the VHF data radio.

Example 19 includes the communications management system of any of examples 14-18, wherein the data indicating that the VHF data radio has received uplink data comprises at least one of an uplink message received by the VHF data radio and a signal quality parameter message from the VHF data radio.

Example 20 includes the communications management system of any of examples 14-19, wherein the processor circuitry is further configured to: detect that at least one of: an aircraft is not on the ground, all exterior aircraft doors are closed, aircraft brakes are off, the aircraft is moving, and all aircraft engines are off; and send a message to the VHF data radio to change a mode of the VHF data radio from VDL mode A to VDL mode 2;

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

What is claimed is:

1. A method, comprising:
    detecting, external to a very high frequency (VHF) data radio, that (i) at least one of: an aircraft is on ground, an exterior aircraft door is open, aircraft brakes are on, the aircraft is stationary, and all aircraft engines are off, and (ii) at least one of: (a) during a first counter period, receives data indicating that the VHF data radio has received uplink data but does not receive any acknowledgement for data intended to be transmitted by the VHF data radio when the VHF data radio is configured to operate, in a VHF channel, in VHF digital link (VDL) mode 2, and (b) during a second counter period, receives data indicating that the VHF data radio has received such uplink data and a VHF channel utilization exceeds an utilization threshold; and
    sending a message to the VHF data radio to change a mode of the VHF data radio from VDL mode 2 to VDL mode A;
    wherein channel utilization is a representation of total power in the VHF channel of the VHF data radio.

2. The method of claim 1, wherein the first counter period and the second counter period are equal.

3. The method of claim 1, wherein sending the message to the VHF data radio to change the mode further comprises resending, to the VHF data radio, messages previously provided for transmission to the VHF data radio, but which were not transmitted by the VHF data radio in the VDL mode 2.

4. The method of claim 1, further comprising determining an average of the VHF channel utilization;
    wherein determining if the VHF channel utilization exceeds the utilization threshold comprises determining if the average of the VHF channel utilization exceeds the utilization threshold.

5. The method of claim 1, further comprising receiving the channel utilization from the VHF data radio.

6. The method of claim 1, wherein the data indicating that the VHF data radio has received the uplink data comprises at least one of an uplink message received by the VHF data radio and a signal quality parameter message from the VHF data radio.

7. A program product comprising a non-transitory processor readable medium on which program instructions are embodied, wherein the program instructions are configured, when executed by at least one programmable processor, to cause the at least one programmable processor to:
    detect, external to a very high frequency (VHF) data radio, that (i) at least one of: an aircraft is on ground, an exterior aircraft door is open, aircraft brakes are on, the aircraft is stationary, and all aircraft engines are off, and (ii) at least one of: (a) during a first counter period, receives data indicating that the VHF data radio has received uplink data but does not receive any acknowledgement for data intended to be transmitted by the VHF data radio when the VHF data radio is configured to operate, in a VHF channel, in VHF digital link (VDL) mode 2, and (b) during a second counter period, receives data indicating that the VHF data radio has received such uplink data and a VHF channel utilization exceeds an utilization threshold; and
    send a message to the VHF data radio to change a mode of the VHF data radio from VDL mode 2 to VDL mode A;
    wherein channel utilization is a representation of total power in the VHF channel of the VHF data radio.

8. The program product of claim 7, wherein the first counter period and the second counter period are equal.

9. The program product of claim 7, wherein sending the message to the VHF data radio to change the mode further comprises resending, to the VHF data radio, messages previously provided for transmission to the VHF data radio, but which were not transmitted by the VHF data radio in the VDL mode 2.

10. The program product of claim 7, wherein the program instructions are configured, when executed by the at least one programmable processor, to further cause the at least one programmable processor to:
    determine an average of the VHF channel utilization;
    wherein determining if the VHF channel utilization exceeds the utilization threshold comprises determine if the average of the VHF channel utilization exceeds the utilization threshold.

11. The program product of claim 7, wherein the program instructions are configured, when executed by the at least one programmable processor, to further cause the at least one programmable processor to: receive the channel utilization from the VHF data radio.

12. The program product of claim 7, wherein the data indicating that the VHF data radio has received the uplink data comprises at least one of an uplink message received by the VHF data radio and a signal quality parameter message from the VHF data radio.

13. The program product of claim 7, wherein the program instructions are configured, when executed by the at least one programmable processor, to further cause the at least one programmable processor to:
    detect that at least one of: the aircraft is not on the ground, all exterior aircraft doors are closed, the aircraft brakes are off, the aircraft is moving, and the all aircraft engines are off; and
    send another message to the VHF data radio to change a mode of the VHF data radio from the VDL mode A to the VDL mode 2.

14. A communications management system (CMU) communicatively coupled to a very high frequency (VHF) data radio, the CMU comprising:
  memory circuitry; and
  processor circuitry communicatively coupled to the memory circuitry and configured to:
    detect that (i) at least one of: an aircraft is on ground, an exterior aircraft door is open, aircraft brakes are on, the aircraft is stationary, and all aircraft engines are off, and (ii) at least one of: (a) during a first counter period, receives data indicating that the VHF data radio has received uplink data but does not receive any acknowledgement for data intended to be transmitted by the VHF data radio when the VHF data radio is configured to operate, in a VHF channel, in VHF digital link (VDL) mode 2, and (b) during a second counter period, receives data indicating that the VHF data radio has received such uplink data and a VHF channel utilization exceeds an utilization threshold; and
    send a message to the VHF data radio to change a mode of the VHF data radio from VDL mode 2 to VDL mode A;
  wherein channel utilization is a representation of total power in the VHF channel of the VHF data radio.

15. The communications management system of claim 14, wherein the first counter period and the second counter period are equal.

16. The communications management system of claim 14, wherein sending the message to the VHF data radio to change the mode further comprises resending, to the VHF data radio, messages previously provided for transmission to the VHF data radio, but which were not transmitted by the VHF data radio in the VDL mode 2.

17. The communications management system of claim 14, wherein the processor circuitry is further configured to:
  determine an average of the VHF channel utilization;
  wherein determining if the VHF channel utilization exceeds the utilization threshold comprises determine if the average of the VHF channel utilization exceeds the utilization threshold.

18. The communications management system of claim 14, wherein the processor circuitry is further configured to receive the channel utilization from the VHF data radio.

19. The communications management system of claim 14, wherein the data indicating that the VHF data radio has received the uplink data comprises at least one of an uplink message received by the VHF data radio and a signal quality parameter message from the VHF data radio.

20. The communications management system of claim 14, wherein the processor circuitry is further configured to:
  detect that at least one of: the aircraft is not on the ground, all exterior aircraft doors are closed, the aircraft brakes are off, the aircraft is moving, and the all aircraft engines are off; and
  send another message to the VHF data radio to change a mode of the VHF data radio from the VDL mode A to the VDL mode 2.

* * * * *